US012098952B2

(12) United States Patent
Siess et al.

(10) Patent No.: US 12,098,952 B2
(45) Date of Patent: Sep. 24, 2024

(54) SPECTRAL RECONSTRUCTION WITH MULTI-CHANNEL COLOR SENSORS

(71) Applicant: ams Sensors Germany GmbH, Jena (DE)

(72) Inventors: Gunter Siess, Oberterzen (CH); Desislava Oppel, St. Bartholomae (AT)

(73) Assignee: ams Sensors Germany GmbH (DE)

( * ) Notice: Subject to any disclaimer, the term of this patent is extended or adjusted under 35 U.S.C. 154(b) by 0 days.

(21) Appl. No.: 17/613,986

(22) PCT Filed: May 15, 2020

(86) PCT No.: PCT/EP2020/063707
§ 371 (c)(1),
(2) Date: Nov. 24, 2021

(87) PCT Pub. No.: WO2020/239481
PCT Pub. Date: Dec. 3, 2020

(65) Prior Publication Data
US 2022/0221341 A1 Jul. 14, 2022

Related U.S. Application Data

(60) Provisional application No. 62/853,225, filed on May 28, 2019.

(51) Int. Cl.
*G01J 3/28* (2006.01)
*G01J 3/12* (2006.01)
*G01J 3/51* (2006.01)

(52) U.S. Cl.
CPC ............ *G01J 3/2803* (2013.01); *G01J 3/513* (2013.01); *G01J 2003/1213* (2013.01); *G01J 2003/1226* (2013.01)

(58) Field of Classification Search
CPC .. G01J 3/2803; G01J 3/513; G01J 2003/1213; G01J 2003/1226; G01J 3/46; G01N 21/25
See application file for complete search history.

(56) References Cited

U.S. PATENT DOCUMENTS

2006/0279647 A1* 12/2006 Wada ..................... H04N 23/11
348/272
2012/0199826 A1 8/2012 Nakahara et al.
(Continued)

FOREIGN PATENT DOCUMENTS

DE 68928401 T2 5/1998
DE 102015209551 A1 12/2016
(Continued)

OTHER PUBLICATIONS

English Translation of Nishikawa WO-2014/097512-A1 Description (Year: 2014).*
(Continued)

*Primary Examiner* — Tarifur R Chowdhury
*Assistant Examiner* — Akbar H. Rizvi
(74) *Attorney, Agent, or Firm* — Michael Best & Friedrich LLP

(57) ABSTRACT

A photodetector device includes: a plurality of light detector elements; and a plurality of filters, in which each filter of the plurality of filters is arranged in front of a light detection surface of a corresponding light detector element to filter incoming light incident on the light detection surface, and in which the plurality of filters are configured to filter at least two different wavelength bands, respectively, of the incoming light, and in which the at least two wavelength bands combine to span a predefined range of wavelengths, and in which each filter of the plurality of filters has a corresponding spectral sensitivity, and in which a sum of the spectral (Continued)

sensitivity curves of the plurality of filters over the predefined range of wavelengths is a constant value.

18 Claims, 8 Drawing Sheets

(56) References Cited

U.S. PATENT DOCUMENTS

| | | | |
|---|---|---|---|
| 2014/0152983 A1* | 6/2014 | Masuda | G01J 3/51 |
| | | | 356/302 |
| 2014/0176729 A1* | 6/2014 | Saari | G01J 3/0208 |
| | | | 348/182 |
| 2018/0224333 A1 | 8/2018 | Sakakibara et al. | |
| 2019/0041263 A1 | 2/2019 | Choi | |
| 2019/0289228 A1* | 9/2019 | Mazliach | G01J 3/36 |
| 2020/0149967 A1* | 5/2020 | Siess | G01N 21/25 |

FOREIGN PATENT DOCUMENTS

| | | |
|---|---|---|
| EP | 3404382 A1 | 11/2018 |
| TW | 201901120 A | 1/2019 |
| WO | WO-2014097512 A1 * 6/2014 ................ G01J 3/36 |
| WO | 2017195195 A1 11/2017 |

OTHER PUBLICATIONS

International Search Report with Written Opinion for related Application No. PCT/EP2020/063707 dated Aug. 25, 2020 (38 Pages).
Finlayson et al., "Finding a Colour Filter to Make a Camera Colorimetric by Optimisation", Feb. 20, 2019, Springer International Publishing, Cham. pp. 53-62. (Provided the Abstract 3-Pages).
Taiwanese Patent Office Action for Application No. 109117688 dated Feb. 29, 2024 (22 pages including English machine translation).
Chinese Patent Office First Action for Application No. 202080039391.1 dated Jun. 19, 2024 (14 pages including English machine translation).
German Patent Office Action for Application No. 112020002614.0 dated Jul. 25, 2024 (13 pages including English machine translation).

* cited by examiner

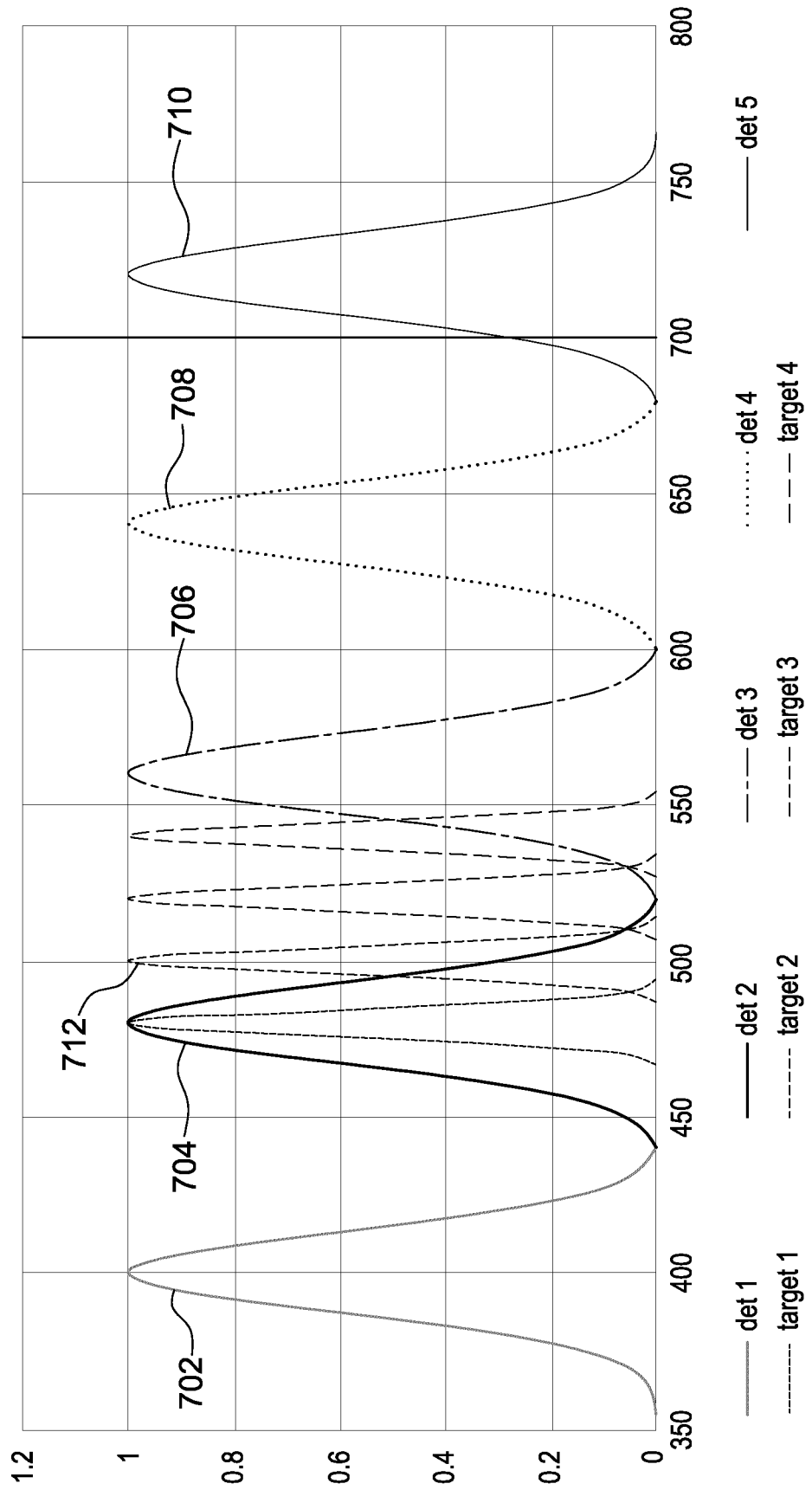

SPECTRAL RECONSTRUCTION WITH MULTI-CHANNEL COLOR SENSORS

TECHNICAL FIELD

The present disclosure relates to spectral reconstruction with multi-channel color sensors.

BACKGROUND

Color measurements of samples are performed by illuminating the sample and measuring reflected spectral components. Thus, the color of the sample is a function of the illumination and a single sample can produce different color impressions (e.g., color coordinates) under different illumination spectra. Furthermore, in some cases, spectrally different samples can also look the same under one illumination, as in metamerism. In order to obtain spectral properties in the color measurement, a sample may be measured and, from knowledge of the illumination spectrum and the measured spectrum, the actual spectral property of the sample can be reconstructed and the color spectrum (e.g., color coordinates) can be determined under an arbitrary illumination spectra.

SUMMARY

The present disclosure relates to spectral reconstruction with multi-channel color sensors, in which the spectral response of the different channel sensors are predefined so that narrow-band spectral components are detected in an energetically proportional manner.

In general, in some aspects, the subject matter of the present disclosure may be embodied in a photodetector device that includes: at least two light detector elements, such as at least three light detector elements; and at least two filters, such as at least three filters, in which each filter of the at least two or at least three filters is arranged in front of a light detection surface of a corresponding light detector element to filter incoming light incident on the light detection surface, and in which the at least two or the at least three filters are configured to filter at least two or at least three different wavelength bands, respectively, of the incoming light, and in which the at least two or at least three different wavelength bands combine to span a predefined range of wavelengths, and in which each filter of the at least two or at least three filters has a corresponding spectral sensitivity, and in which a sum of the spectral sensitivity curves of the at least two or the at least three filters over the predefined range of wavelengths is a constant value.

Implementations of the photodetector may have one or more of the following features. For example, in some implementations, each of the spectral sensitivity curves used in the sum is normalized to a predefined value.

In some implementations, the constant sum over a first wavelength range that is smaller than and within the predefined range of wavelengths consists of the summation of the spectral sensitivity curve of a first filter and the spectral sensitivity curve of a second filter.

In some implementations, a spectral sensitivity curve of at least one filter of the at least three filters has a shape represented by a cosine function.

In some implementations, a spectral sensitivity curve of at least one filter has a shape of a triangular function.

In some implementations, a spectral sensitivity of at least one filter has a shape of a trapezoidal function.

In some implementations, for each filter of the at least three filters, the spectral sensitivity curve of the filter includes a corresponding peak value and a corresponding full-width half maximum (FWHM) value, in which the FWHM value of a first filter is greater than a distance between the peak value of the first filter and the peak value of a second filter.

In some implementations, a shape of the spectral sensitivity curve for each filter is identical.

In some implementations, a shape of the spectral sensitivity curve of a first filter is different than a shape of the spectral sensitivity curve of a second filter.

In some implementations, a shape of the spectral sensitivity curve of a first filter is a mirror image of a shape of the spectral sensitivity curve of a second filter.

In some implementations, the predefined range of wavelengths spans a wavelength between about 380 nm and about 780 nm.

In some implementations, for each filter, the spectral sensitivity curve of the filter includes a corresponding peak value and a corresponding full-width half maximum (FWHM) value, and the FWHM of a first filter is greater than or equal to 25 nm.

In some implementations, the at least two or the at least three filters are contained in a line array.

In some implementations, the at least two or the at least three filters are contained in a two-dimensional array. In some implementations, the at least three filters are arranged in a circular pattern, e.g., in a symmetrical circular pattern.

In some implementations, each filter is a bandpass filter configured to transmit light over its respective wavelength band of the incoming light.

In some implementations, each filter is an absorption filter configured to absorb light over its respective wavelength band of the incoming light.

In some implementations, each filter includes an interference filter or a plasmonic filter.

Implementations of the present subject matter offer various advantages. For example, in some implementations, the sensitivity function of multichannel spectral sensors is designed so that target spectra enter into the sensor channels in an energetically proportional manner and energetic signal losses are limited due to narrow-band spectra. In some implementations, inhomogeneous spectra of illumination (e.g., from a white LED) in reflective measurements can be balanced.

The details of one or more embodiments are set forth in the accompanying drawings and the description below. Other features and advantages will be apparent from the description, the drawings, and the claims.

BRIEF DESCRIPTION OF THE DRAWINGS

FIG. 7 is a plot that illustrates spectral sensitivity curves of a photodetector device.

DETAILED DESCRIPTION

In order to simplify the measurement requirements for a spectrometer, spectrometer systems have been developed with a reduced number of measuring channels (e.g., photodetector elements with associated filter structures having different transmission spectral responses) so that smaller and cheaper spectrometers can be implemented. The measurements recorded by the different channels of the spectrometer are used to reconstruct the overall spectrum of incident light. Each channel of the spectrometer provides what is referred to as a "support point" for the reconstructed spectrum. In general, the achievable resolution, and thus the quality, of a spectral reconstruction process depends, in part, on the spectrometer's sensitivity function and the scanning range of the spectrometer (e.g., the number and distribution of the support points). If the incident spectrum includes one or more relatively steep features (e.g., a high power component within a relatively narrow wavelength band), such steep features may not be reconstructed, especially when there are few support points. In contrast, the greater the number of support points (e.g., the greater number of spectrometer channels covering different wavelength bands), the greater the probability that the steep features of the incident spectrum can be reconstructed.

Figure 1:
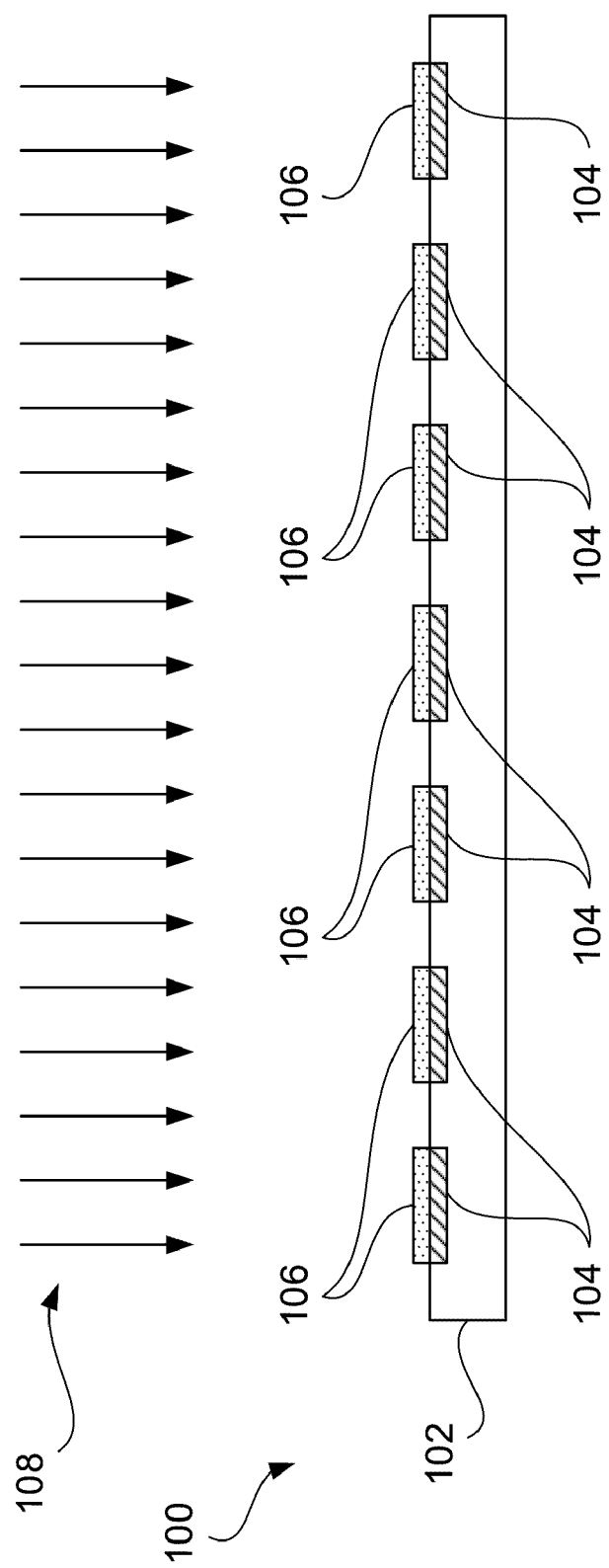
FIG. 1 is a schematic that illustrates an example of a photodetector device that includes multiple detector elements and multiple filters on a substrate.

FIG. 1 is a schematic that illustrates an example of a photodetector device 100, e.g., a multi-spectral sensor device such as a spectrometer device, that includes multiple detector elements 104 and multiple optical filters 106 on a substrate 102 according to the present disclosure. In particular, the photodetector device 100 includes at least three light detector elements 104 and at least three optical filters 106, in which each optical filter 106 of the at least three optical filters is arranged in front of a light detection surface of a corresponding light detector element 104. The light detector elements 104 may include, e.g., a photodetector element such as a photodiode (e.g., a silicon photodiode). The light detector elements 104 may be formed in or on the substrate 102. The optical filters 106 are configured to filter incident light so that only a portion of the incident wavelengths are detected by the underlying light detector element 104.

The optical filters 106 may include, e.g., bandpass filters that are configured to transmit incident light over different respective wavelength bands of the incoming light, while blocking, absorbing or reflecting light having wave lengths outside of the respective wavelength band. In the case of bandpass filters, the passband of each filter 106 may cover a wavelength band that is different from each other filter 106 in the device 100. In some implementations, a wavelength band may be defined as the full-width half maximum of the filter spectral response. Alternatively, the wavelength band may be defined as the wavelength range over which the filter spectral response is greater than some minimum sensitivity value. For instance, the wavelength band of one or more of the filters 106 may be defined as the range of wavelengths over which the spectral response of the filter is greater than about 0.2, greater than about 0.3, greater than about 0.4, greater than about 0.5, greater than about 0.6, greater than about 0.7, or greater than about 0.8, among others.

Since the transmission wavelength band may be different for different filters, it can be advantageous, in some implementations, to use at least three light detector elements 104 and at least three corresponding filters 106 in the device 100. For instance, at least three different filters may provide color detection across at least three different color coordinates (e.g., for the red, blue and green color model). A multi-spectral sensor device may include other numbers of filter-light detector pairs (i.e., a combination of a filter and underlying light detector), however. For instance, a multi-spectral sensor device may include 2, 4, 5, 6, 7, 8, 9, 10, 15, 20, 25, 30, 35, 40, 45, or 50 filter-light detector pairs.

In some implementations, the filters 106 include absorption filters configured to absorb incident light over different respective wavelength bands of the incoming light, while allowing light outside of the wavelength bands to pass to the light detector element 104 located beneath the filter 106.

The filters 106 may include, e.g., interference filters or plasmonic filters. The interference filters may include multiple thin layers of material, such as thin film dielectrics, having alternating refractive indices. For instance, the filters 106 may be stacks of dielectric thin films with alternating low refractive index and high refractive index material. The number of layers in the interference filter may vary. For instance, the number of dielectric thin films in an interference filter may include 2, 3, 4, 5, 6, 7, 8 or more thin film dielectric layers. The material used as the thin film dielectric layers may include, e.g., $SiO_2$, $TiO_2$, $Ta_2O_5$, $Nb_2O_5$, $Si\,N_4$ among others. The thickness and position of the layers within each stack (e.g., whether the dielectric thin film is a bottom-most layer, an upper-most layer, or an intervening layer) may depend on the design of the filter stack and the desired transmission spectra of the filter 106. Therefore, each filter 106 of the device 100 may have a different design from the other filters 106 of the device 100. In some cases, the interference filters may be polymer-based interference filters. In some implementations, the interference filters may be Fabry-Perot interference filters.

The light detectors 104 and the filters 106 are illustrated in FIG. 1 as being arranged in a one-dimensional line array. However, the detectors 104 and their corresponding filters 106 may be arranged in a two-dimensional array instead. In some implementations, the detectors 104 and the filters 106 are arranged in a circular pattern, e.g., in a symmetrical circular pattern, in which the detectors 104 and filters 106 are evenly spaced from adjacent detector-filter pairs.

Each filter-detector pair in the multi-spectral sensor device 100 is associated with a corresponding spectral sensitivity. Spectral sensitivity is the relative efficiency with which light is transmitted through the filter 106 and detected by the detector as a function of the frequency or wavelength of the incident signal. In some implementations, the spectral sensitivity of each optical filter 106 includes a corresponding peak value and a corresponding full-width half maximum (FWHM) value. The FWHM of one or more of the filters 106 may be greater than or equal to 25 nm, greater than or equal to 30 nm, greater than or equal to 35 nm, greater than or equal to 40 nm, greater than or equal to 45 nm, greater than or equal to 50 nm, greater than or equal to 60 nm, greater than or equal to 75 nm, greater than or equal to 100 nm, greater than or equal to 125 nm, or greater than or equal to 150 nm, although other minima are also possible. In some implementations, the FWHM is less than or equal to 200 nm, less than or equal to 175 nm, less than or equal to 150 nm, less than or equal to 125 nm, less than or equal to 100 nm, less than or equal to 75 nm, less than or equal to 60 nm, less than or equal to 50 nm, less than or equal to 45 nm, less than or equal to 40 nm, less than or equal to 35 nm, or less than or equal to 30 nm, although other maxima are also possible.

FIG. 7 is a plot that illustrates spectral sensitivities of a multi-spectral sensor device that includes five transmission filters having different spectral sensitivity curves 702-710. As shown in FIG. 7, the spectral sensitivity curves 702-710 together span a wavelength range between about 350 nm to little more than about 750 nm. As also shown in FIG. 7, each individual filter has a corresponding spectral sensitivity with a FWHM that is equal to about 25 nm. Given the relatively narrow bandwidths of the spectral sensitivities 702-710, a spectral reconstruction process based on a multi-spectral sensor device configured to have the properties shown in FIG. 7 may be unable to reconstruct one or more relatively steep features (e.g., a high power component within a relatively narrow wavelength band that falls between the positions corresponding the peak values of the different spectral sensitivity curves 702-710). For instance, the dotted lines 712 represent a target spectra having peaks that fall in regions where the magnitude of curves 704 and 706 is very low or relatively insignificant. Thus, the convolution of the spectral sensitivity curves 702-710 with the target spectra would provide little to no information with respect to those peaks. Furthermore, even if such features could be detected, the reconstruction of such features may not be done in an energetically proportional manner that accurately reflects the incident spectra.

As described herein, the spectral sensitivities of multiple filters can be reconfigured, however, in such a way that various target spectra can be reconstructed in an energetically proportional manner, without energetic signal loss, regardless of the presence of narrow-band and/or steep components within the incident spectra. In particular, the spectral sensitivities of the various filters of a multi-spectral sensor device, such as the device 100, can be configured so that a sum of the spectral sensitivities over a predefined wavelength range is kept constant. In this way, the spectral change in extrema (flanks or peaks) within a target spectra are not detected spectrally, as in the device configured to exhibit the properties shown in FIG. 7, but instead are detected integrally. That is to say, the spectral sensitivities of the different channels are configured so that a summation function provides a uniform distribution over a full spectral range of the multi-spectral sensor device, in which the full spectral range of the multi-spectral sensor device may be defined as the difference between the smallest wavelength associated with a peak spectral sensitivity of a filter channel and the largest wavelength associated with a peak spectral sensitivity of a filter channel.

Figure 2:
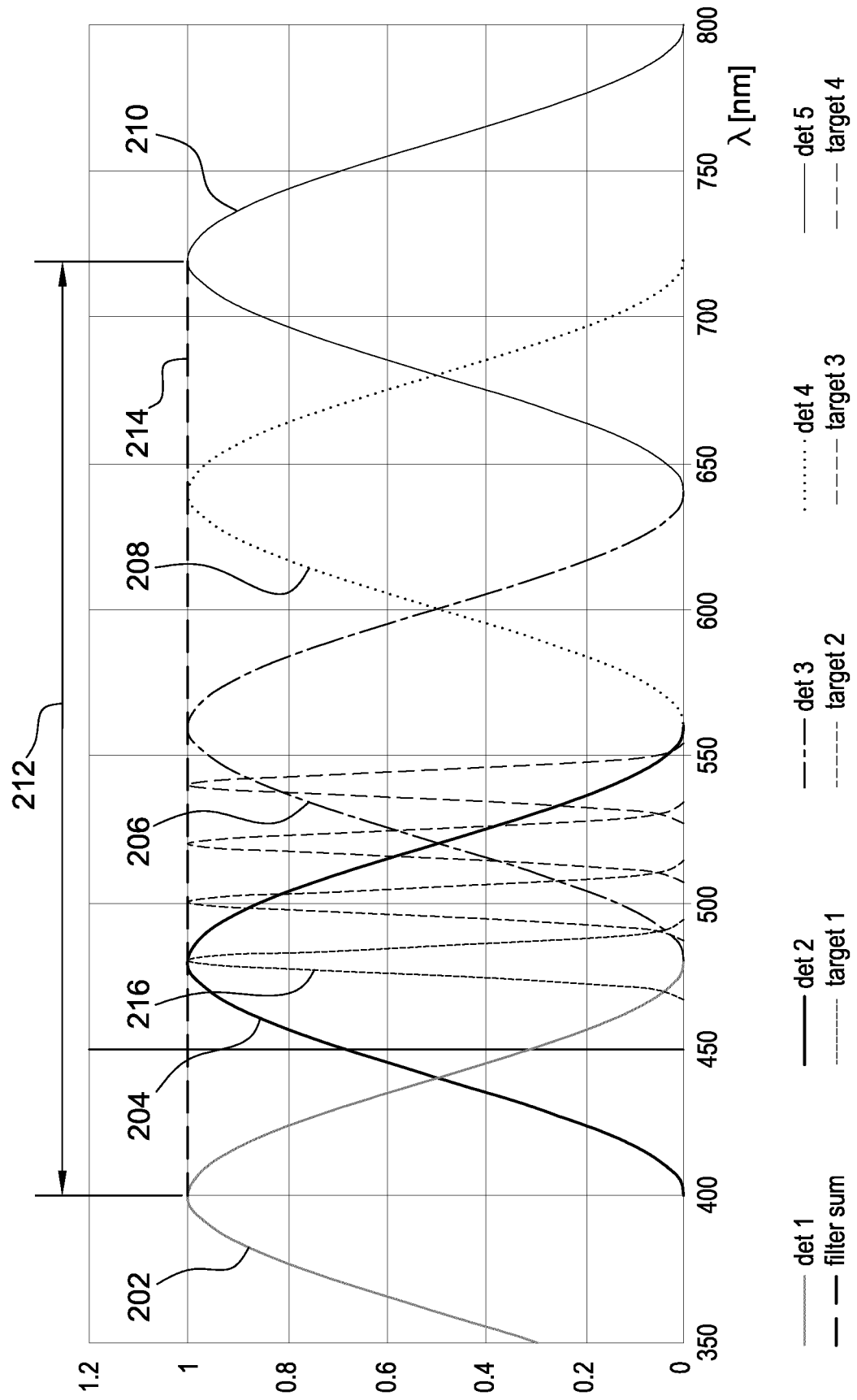
FIG. 2 is a plot of an exemplary spectral response of a photodetector device in which the filters have been configured so that a sum of the spectral sensitivity curves over a predefined wavelength range is constant.

FIG. 2 is a plot of an exemplary spectral response of a multi-spectral sensor device, e.g., a spectrometer, in which the optical filters have been configured so that a sum of the spectral sensitivities over a predefined wavelength range is constant. As shown in FIG. 2, the spectrometer device is composed of 5 separate channels, each of which has a corresponding spectral sensitivity (202, 204, 206, 208, 210). Each of the spectral sensitivities for a spectrometer device, such as the device associated with FIG. 2, may be normalized to a constant value. For instance, as shown in FIG. 2, the spectral sensitivities 202-210 are all normalized to a value of 1. Each of the spectral sensitivities are configured to have shapes such that a sum 214 of the spectral sensitivities shown in FIG. 2 over a predefined range 212 of wavelengths is constant as a function of wavelength. For instance, in the example of FIG. 2, the sum 214 is equal to a value of 1 over the wavelength range 212.

Modifying the spectral sensitivities of the filters in this way allows target spectra with narrow-band and/or steep components to be detected in an energetically proportional manner without signal loss. For instance, each of the narrowband peaks within target spectra 216 can still be detected in an energetically proportional manner using the spectral sensitivity configuration shown in FIG. 2.

Stated another way, the spectral sensitivities of each filter-detector pair of a multi-spectral sensor device can be expressed as follows:

$$const = \sum_{i=1}^{k} a_i * S\_det_i(\lambda), \forall \lambda = \{\lambda_{min} \ldots \lambda_{max}\}$$

where $\lambda_{min}$ is the minimum wavelength of the predefined wavelength range, $\lambda_{max}$ is the maximum wavelength of the predefined wavelength range, k is the number of filters or detector channels, $S\_det_i$ is the spectral sensitivity of filter or channel i, $a_i$ is a scaling factor for the filter or channel i, and const represents a constant value.

As shown in FIG. 2, the predefined wavelength range 212 covers a wavelength band that starts from the minimum wavelength associated with a peak spectral sensitivity of a filter channel (i.e., filter 202 at $\lambda_{peak} \approx 400$ nm) and the maximum wavelength associated with a peak spectral sensitivity of a filter channel (i.e., filter 210 at $\lambda_{peak} \approx 720$ nm). Thus, the predefined wavelength range 212 covers a wavelength band of about 320 nm.

In some implementations, the predefined wavelength range over which the sum of the spectral reflectivities is constant may cover, e.g., the wavelength bands of at least two filters within the multi-spectral sensor device including, e.g., covering the wavelength bands of at least three filters within the multi-spectral sensor device, covering the wavelength bands of at least four filters within the multi-spectral sensor device, covering the wavelength bands of at least five filters within the multi-spectral sensor device, covering the wavelength bands of at least ten filters within the multi-spectral sensor device, covering the wavelength bands of at least fifteen filters within the multi-spectral sensor device, covering the wavelength bands of at least twenty filters within the multi-spectral sensor device, or covering the wavelength bands of at least twenty-five filters within the multi-spectral sensor device, among others.

In some implementations, the predefined wavelength range over which the sum of the spectral reflectivities is constant may cover the visible wavelength range. For instance, the predefined wavelength range over which the sum is constant may be between about 380 nm to about 780 nm. In some cases, the predefined wavelength range over which the sum of spectral sensitivities is constant covers wavelengths in the ultraviolet, near infrared, and/or visible wavelength ranges. For instance, the predefined wavelength range over which the sum is constant may be between about 10 nm to about 380 nm. In another example, the predefined wavelength range over which the sum is constant may be between about 780 nm to about 5 microns.

Figure 3:
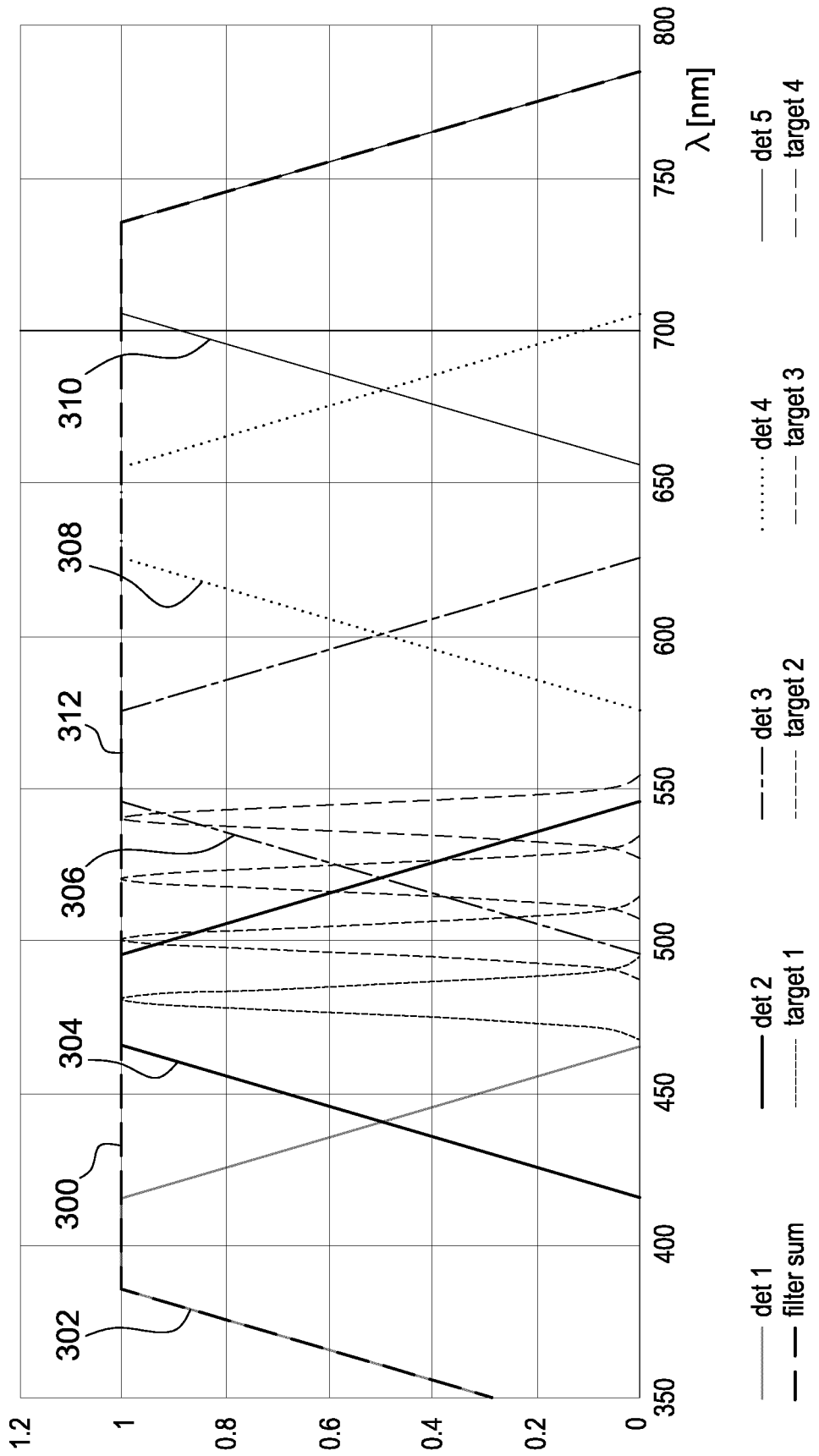
FIGS. 3-4 are plots of exemplary spectral responses of photodetector devices in which the filters have been configured so that a sum of the spectral sensitivity curves over a predefined wavelength range is constant, and where the shapes of the spectral sensitivity curves are triangular or trapezoidal.

The spectral sensitivity shapes of each channel shown in FIG. 2 are referred to as "cosine" shapes because the curve substantially tracks the shape of a curve represented by a cosine function. Spectral sensitivities of the filters are not limited to such shapes, however. For instance, FIG. 3 is a plot of exemplary spectral responses of a multi-spectral sensor device (e.g., a spectrometer device) in which the optical filters of the spectrometer have been configured so that a sum 300 of the filters' spectral sensitivities (302-310) over a predefined wavelength range is constant, and in which the shapes of the spectral sensitivities are trapezoidal. That is, the peak value, such as peak 312 of filter 306, of each filter's spectral sensitivity is constant over a broader wavelength range. The width of the broadened peaks, such as peak 312, may be at least 5 nm, at least 10 nm, at least 15 nm, at least 20 nm, at least 25 nm, or at least 30 nm, though other widths are also possible. The width of the peaks may be limited by the filter construction design and may be less than 50 nm, less than 45 nm, less than 40 nm, or less than 35 nm.

Other spectral sensitivity shapes are also possible. For instance, FIG. 4 is a plot of exemplary spectral responses of a multi-spectral sensor device (e.g., a spectrometer device) in which the optical filters of the spectrometer have been configured so that a sum 400 of the filters' spectral sensitivities (402-410) over a predefined wavelength range is constant, and in which the shapes of the spectral sensitivities are triangular.

Figure 4:
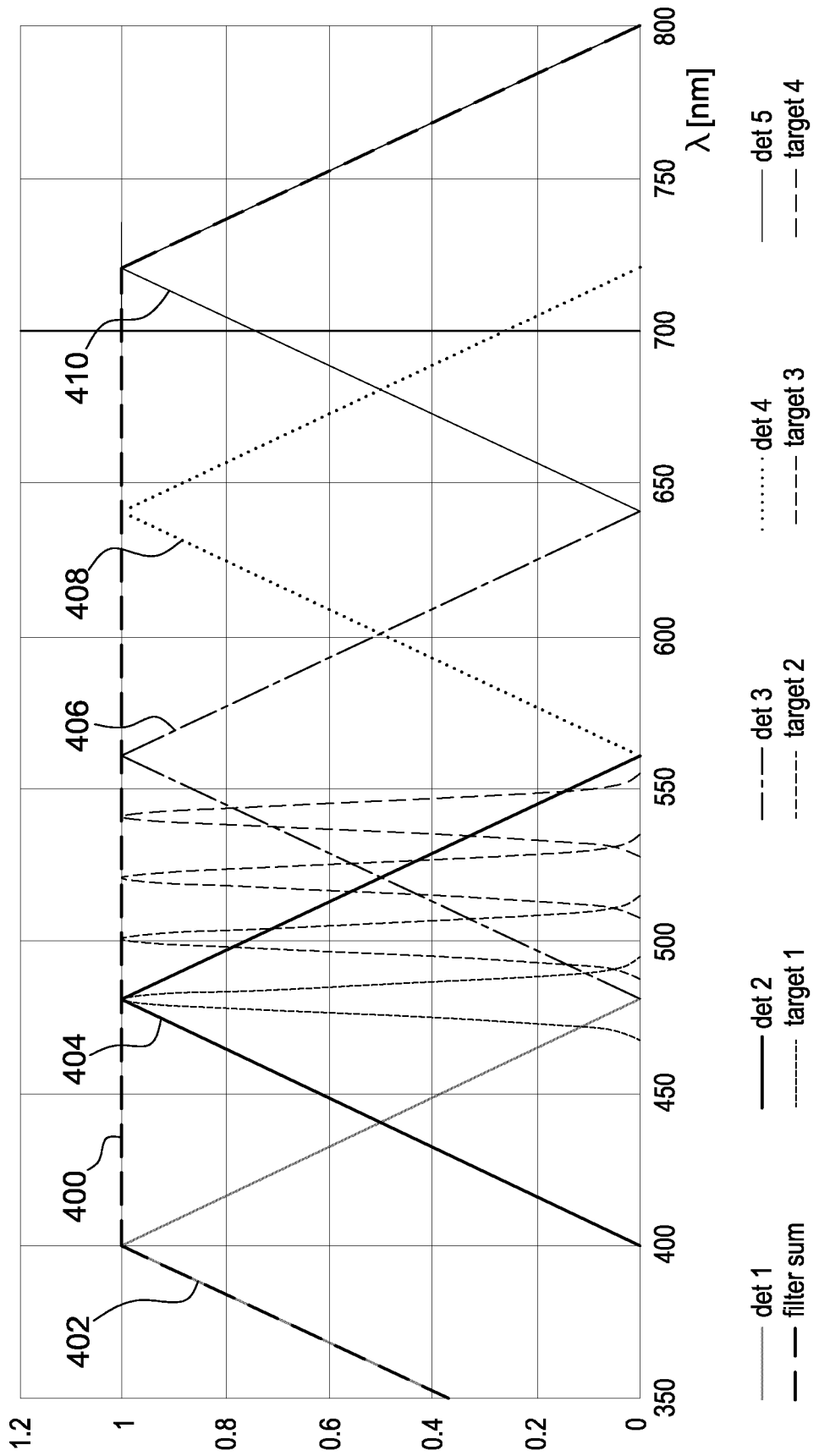
Figure 5:
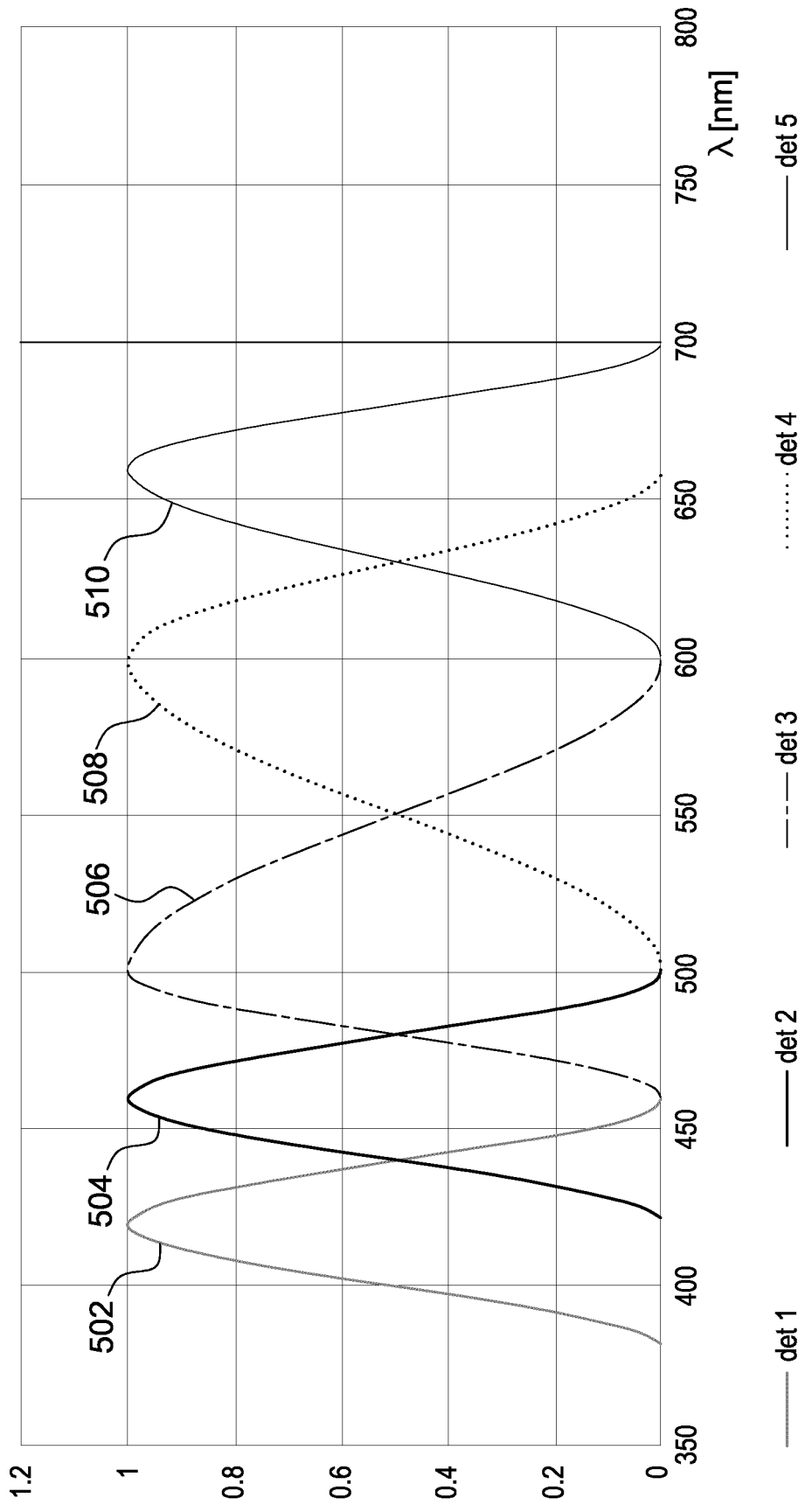
FIG. 5 is a plot of an exemplary spectral response of a photodetector device in which the optical filters have been configured so that a sum of the spectral sensitivity curves over a predefined wavelength range is constant, and in which the shapes of the spectral sensitivity curves for at least two optical filters are different.

Although the spectral sensitivities illustrated in FIGS. 2-4 have identical shapes for each optical filter, the optical filters within a multi-spectral sensor device may exhibit different shapes. For example, FIG. 5 is a plot of an exemplary spectral response of a multi-spectral sensor device (e.g., a spectrometer device) in which the optical filters have been configured so that a sum of the spectral sensitivities over a predefined wavelength range is constant, and in which the shape of the spectral sensitivities for at least two optical filters is different. In particular, the shape of each of spectral sensitivity curves 506, 508 and 510 is different from one another. Spectral sensitivity curve 506 is steeper on the lower wavelength side of its peak and a more gradual slope on the higher wavelength side of its peak. In contrast, the sensitivity curve 508 has a gradual slope on the lower wavelength side of its peak and a steeper slope on the higher wavelength side of its peak. Moreover, the separation of the spectral sensitivity peaks may be asymmetric. For instance, as shown in FIG. 5, the peak associated with curve 506 is further away from the peak associated with curve 508 than it is from the peak associated with curve 504.

Alternatively or in addition, the spectral sensitivity curves of two filters of the multi-spectral sensor device may be mirror images of one another. For instance, the shape of spectral sensitivity curve 506 is a mirror image of the shape spectral sensitivity curve 508 as viewed around an imaginary axis that extends vertically at the 550 nm wavelength.

In each of the example plots shown in FIGS. 2-5, the sum of the spectral sensitivities over the entire predefined wavelength range is a function, at each wavelength within the range, of the combination of only two spectral sensitivity curves. For example, referring again to FIG. 2, the constant sum 214 of the spectral sensitivity curves between wavelengths of about 400 nm and about 480 nm is a result of the combination of curves 202 and 204; the constant sum 214 of the spectral sensitivity curves between wavelengths of about 480 nm and about 560 nm is a result of the combination of curves 204 and 206; the constant sum 214 of the spectral sensitivity curves between wavelengths of about 560 nm and about 640 nm is a result of the combination of curves 206 and 208; the constant sum 214 of the spectral sensitivity curves between wavelengths of about 640 nm and about 720 nm is a result of the combination of curves 208 and 210. Stated another way, it can be said that the constant sum of spectral sensitivity values over a subset of the predefined range 212 of wavelengths consists of the summation of spectral sensitivity values of a first filter and the spectral sensitivity values of a second filter. The spectral sensitivities shown in the plots may have one or more advantages. For example, in some implementations, if one wishes to analyze/reconstruct more in detail a lower spectral range of visible light, it is possible to define more channels having lower spectral separation in that range. If there are spectral ranges with less detail interest (e.g., outside of the visible range), then it is possible to widen the spectral separation in those ranges.

In other implementations, the constant sum of the spectral sensitivity values over a subset of the predefined range 212 of wavelengths may include the summation of spectral sensitivity values of more than just two filters. For example, in some cases, the constant sum may be due to the summation of spectral sensitivity values associated with three different filters, four different filters, five different filters, or more.

In some implementations, a FWHM value of the spectral sensitivity curve of a first filter in the spectrometer is greater than a distance between the peak value of the spectral sensitivity curve of the first filter and a peak value of a spectral sensitivity curve of a second filter in the spectrometer. For instance, referring to FIG. 2, the spectral sensitivity curve 202 could be modified to have a FWHM of 120 nm, whereas the distance between the peak of curve 202 and the peak of curve 204 could be set to be 100 nm.

Figure 6A:
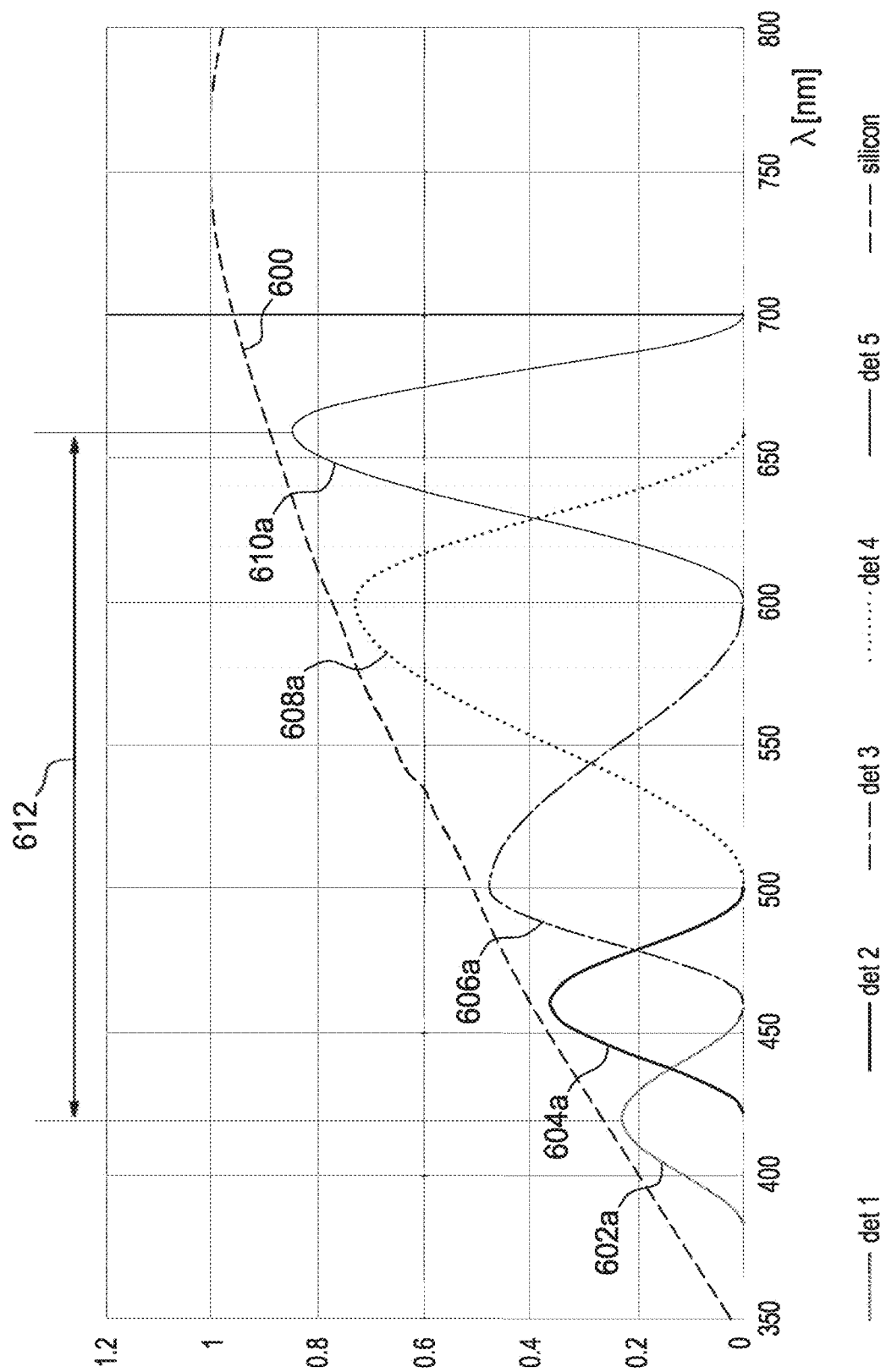
FIG. 6A is a plot of an exemplary spectral response of a photodetector device and a plot of the spectral sensitivity curve of silicon over a predefined wavelength range.

In some implementations, when designing a multi-spectral sensor device, the spectral sensitivity of the light detector element should be taken into account. In these circumstances, the spectral sensitivity curves for each filter are scaled to the maximum spectral sensitivity curve of the detector elements. For instance, FIG. 6A is a plot of exemplary spectral sensitivity curves (602, 604, 606, 608, 610) of a photodetector device scaled to the spectral sensitivity curve 600 of a silicon detector element (e.g., a silicon photodiode) over a predefined wavelength range 612. That is, the plot in FIG. 6A shows the absolute spectra sensitivity of the scaled sensor seen in FIG. 5 and represents a target shape. As can be seen from FIG. 6A, the magnitude of curve 600 increases from a wavelength of about 350 nm to a wavelength of about 750 nm. The filters of the spectrometer are designed to exhibit scaled spectral sensitivity curves (602a, 604a, 606a, 608a, 610a) that match the increase in the curve 600 over that same wavelength range.

Figure 6B:
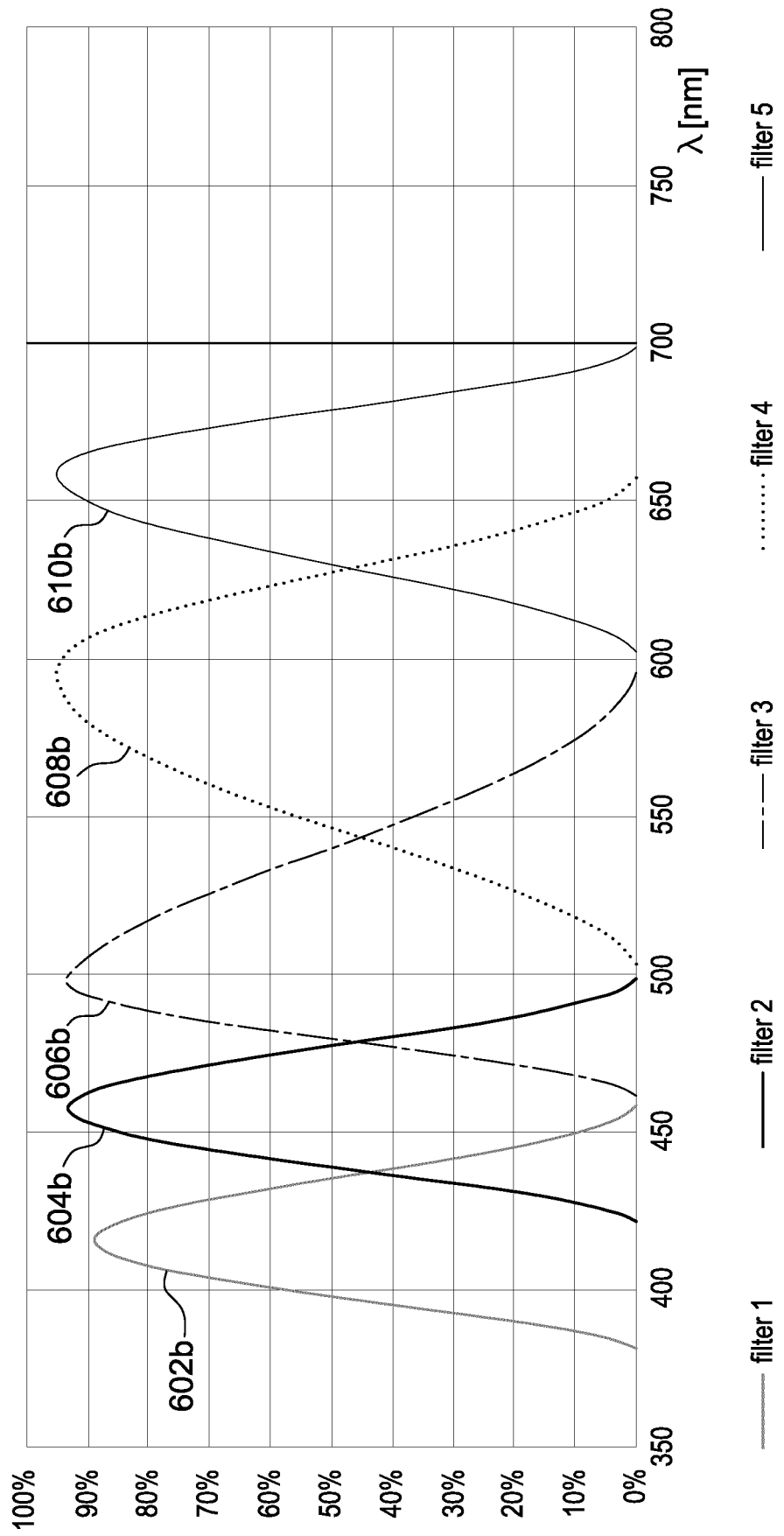
FIG. 6B is a plot of an exemplary spectral response of a photodetector device scaled to the spectral sensitivity curve of silicon over a predefined wavelength range.

FIG. 6B is a plot of an exemplary spectral response curves for filters of a spectrometer as calculated based on the scaling of the curves in FIG. 6A. Each curve (602b, 604b, 606b, 608b, 610b) in FIG. 6B corresponds to a spectral response curve for the spectral sensitivity curves (602a, 604a, 606a, 608a, 610a), respectively. FIG. 6B thus shows the requirement of the filter design which may be expressed as $F_i(\lambda)=S\_det_i(\lambda)/S_i(\lambda)$. Because of the shape of Si there are some differences between sensor sensitivity (solid line) and transmission of filter (dashed line) seen in the new graphs As explained herein, the filters of the present disclosure can be interference filters, such as interference filters formed from thin film dielectric layers of alternating refractive index. The configuration of the layers (e.g., thickness, number of layers, order of layers) may be determined using optimization techniques. For instance, a designer provides a starting design whose properties are sufficiently close to the specifications required by the filter spectral sensitivity curve. Then, an optimization algorithm may be used to adjust the thickness of the layers and, in some cases, their index of refraction until a design that best fits the desired spectral sensitivity curve characteristics is achieved. Further details on fabrication of interference filters for a specified spectral responsivity curve can be found, e.g., in "OpenFilters: open-source software for the design, optimization, and synthesis of optical filters" by S. Larouche and L. Martinu, Applied Optics Vol. 47 (13), pp. C219-C230 (2008), incorporated by reference herein in its entirety.

With the formation method of the channel sensitivities according to the invention, a stable detection of arbitrary narrow-band target spectra can also be achieved. The reconstruction of the total spectrum is improved to such an extent that the energy components are proportionally imaged into the sensor signals, without requiring an substantial increase in the number of filter-detector pairs.

A number of embodiments have been described. Nevertheless, it will be understood that various modifications may be made without departing from the spirit and scope of the invention. Accordingly, other embodiments are within the scope of the following claims.

The invention claimed is:

1. A photodetector device comprising:
at least three light detector elements; and
at least three optical filters, wherein each optical filter of the at least three optical filters is arranged in front of a light detection surface of a corresponding light detector element of the at least three light detector elements to filter incoming light incident on the light detection surface,
wherein the at least three optical filters are configured to filter at least three different wavelength bands, respectively, of the incoming light, wherein the at least three different wavelength bands combine to span a predefined range of wavelengths,
wherein each optical filter of the at least three optical filters has a corresponding spectral sensitivity, and
wherein a sum of the spectral sensitivities of the at least three optical filters over the predefined range of wavelengths is a constant value.

2. The photodetector of claim 1, wherein each of the spectral sensitivities of the at least three optical filters used in the sum is normalized to a predefined value.

3. The photodetector of claim 1, wherein the sum over a first wavelength range that is smaller than and within the predefined range of wavelengths consists of the summation of the spectral sensitivity of a first optical filter of the at least three optical filters and the spectral sensitivity of a second optical filter of the at least three optical filters.

4. The photodetector of claim 1, wherein a spectral sensitivity of at least one optical filter of the at least three optical filters has a shape of a curve represented by a cosine function.

5. The photodetector of claim 1, wherein a spectral sensitivity of at least one optical filter of the at least three optical filters has a shape of a triangular function.

6. The photodetector of claim 1, wherein a spectral sensitivity of at least one optical filter of the at least three optical filters has a shape of a trapezoidal function.

7. The photodetector of claim 1, wherein, for each optical filter of the at least three optical filters, the spectral sensitivity of the optical filter comprises a corresponding peak value and a corresponding full-width half maximum (FWHM) value, and
wherein the FWHM value of a first optical filter of the at least three optical filters is greater than a distance between the peak value of the first optical filter and the peak value of a second optical filter of the at least three optical filters.

8. The photodetector of claim 1, wherein a shape of the spectral sensitivity for each optical filter of the at least three optical filters is identical.

9. The photodetector of claim 1, wherein a shape of the spectral sensitivity of a first optical filter of the at least three filters is different than a shape of the spectral sensitivity of a second optical filter of the at least three filters.

10. The photodetector of claim 1, wherein a shape of the spectral sensitivity of a first optical filter of the at least three filters is a mirror image of a shape of the spectral sensitivity of a second optical filter of the at least three filters.

11. The photodetector of claim 1, wherein the predefined range of wavelengths spans a wavelength between about 380 nm and about 780 nm.

12. The photodetector of claim 1, wherein, for each optical filter of the at least three optical filters, the spectral sensitivity of the optical filter comprises a corresponding peak value and a corresponding full-width half maximum (FWHM) value, and
wherein the FWHM of a first optical filter of the at least three filters is greater than or equal to 25 nm.

13. The photodetector of claim 1, wherein the at least three optical filters are contained in a line array.

14. The photodetector of claim 1, wherein the at least three optical filters are contained in a two-dimensional array.

15. The photodetector of claim 1, wherein each optical filter of the at least three filters is a bandpass filter configured to transmit light over its respective wavelength band of the incoming light.

16. The photodetector of claim 1, wherein each optical filter of the at least three filters is an absorption filter configured to absorb light over its respective wavelength band of the incoming light.

17. The photodetector of claim 1, wherein each optical filter of the at least three filters comprises an interference filter.

18. The photodetector of claim 1, wherein the at least three optical filters are arranged in a circular pattern.

* * * * *